(12) United States Patent
Busaba et al.

(10) Patent No.: US 8,140,951 B2
(45) Date of Patent: Mar. 20, 2012

(54) METHOD AND SYSTEM FOR INSTRUCTION ADDRESS PARITY COMPARISON

(75) Inventors: Fadi Y. Busaba, Poughkeepsie, NY (US); Brian R. Prasky, Wappingers Falls, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 12/031,732

(22) Filed: Feb. 15, 2008

(65) Prior Publication Data
US 2009/0210775 A1    Aug. 20, 2009

(51) Int. Cl.
*G06F 11/00* (2006.01)
*H03M 13/00* (2006.01)
(52) U.S. Cl. .............. 714/803; 814/800; 814/805
(58) Field of Classification Search .......... 714/800, 714/803, 805
See application file for complete search history.

(56) References Cited

U.S. PATENT DOCUMENTS 4,074,229 A * 2/1978 Prey ................. 714/52
5,241,547 A * 8/1993 Kim ................. 714/53
5,701,315 A * 12/1997 Pitot et al. ............ 714/805

OTHER PUBLICATIONS z/Architecture, Principles of Operation, Sixth Edition, Apr. 2007, Publication No. SA22-7832-05, copyright IBM Corp. 1990-2007, pp. 1-1218.

* cited by examiner

*Primary Examiner* — Sam Rizk
(74) *Attorney, Agent, or Firm* — Cantor Colburn LLP; John Campbell

(57) ABSTRACT

A method and system for instruction address parity comparison are provided. The method includes calculating an instruction address parity value for an instruction, and distributing the instruction address parity value to one or more functional units in processing circuitry. The method also includes receiving the distributed instruction address parity value from the one or more functional units, and calculating a completing instruction address (CIA) parity value associated with completing the instruction. The method further includes generating an error indicator in response to a mismatch between the received instruction address parity value and the CIA parity value.

20 Claims, 3 Drawing Sheets

METHOD AND SYSTEM FOR INSTRUCTION ADDRESS PARITY COMPARISON

BACKGROUND OF THE INVENTION

This invention relates generally to error detection in processing circuitry, and more particularly to enhancing error detection in processing circuitry using instruction address parity comparison.

As digital designs with processing circuitry, such as microprocessors, become more complex, demand for improved error detection is also increasing. In a microprocessor or any complex design that provides best of breed error detection, various approaches may be devised to check for possible errors caused by design flaws or single event upsets. A single event upset (SEU) is a change of state caused by a high-energy particle strike to a sensitive node in a micro-electronic device that may result from environmental effects, such as alpha particles. SEUs, as well as design flaws, can result in the unexpected changes in state. Error checking techniques in processing systems are typically localized physically, either in specific data flows, state machines, or interfaces, and therefore limited in scope of coverage. In processing circuitry with deep pipelines, better schemes to cover a wide scope of the design are desirable. As pipelined instructions advance through pipeline stages, multiple functional units within the processing circuitry may be involved in performing various tasks to determine address values for the current instruction and next instruction. These instructions addresses may be sequentially generated, or from performing a branch to its targets, or from new program start up, or interrupt conditions. Since many of the states used to perform the actual execution of a program are used to also determine the instruction address, detecting an errant address value will also indirectly capture any incorrect state that exists for other duties. An error could occur at any stage in the pipeline in any of the units and lead to further problems downstream, as future address values are modified based on an errant address value.

It would be beneficial to develop an approach to quickly identify error conditions in resulting incorrect instruction address values after instructions are passed through various functional units in processing circuitry. Accordingly, there is a need in the art for enhancing error detection in processing circuitry using instruction address parity comparison.

BRIEF SUMMARY OF THE INVENTION

An exemplary embodiment includes a method for instruction address parity comparison. The method includes calculating an instruction address parity value for an instruction, and distributing the instruction address parity value to one or more functional units in processing circuitry. The method also includes receiving the distributed instruction address parity value from the one or more functional units, and calculating a completing instruction address (CIA) parity value associated with completing the instruction. The method further includes generating an error indicator in response to a mismatch between the received instruction address parity value and the CIA parity value.

Another exemplary embodiment includes a system for instruction address parity comparison in processing circuitry. The system includes one or more functional units to process an instruction in the processing circuitry. The system additionally includes an instruction fetching unit (IFU) in communication with the one or more functional units in the processing circuitry. The IFU performs a method that includes calculating an instruction address parity value for the instruction, and distributing the instruction address parity value to the one or more functional units in the processing circuitry. The method also includes receiving the distributed instruction address parity value from the one or more functional units, and calculating a CIA parity value associated with completing the instruction. The method further includes generating an error indicator in response to a mismatch between the received instruction address parity value and the CIA parity value.

A further exemplary embodiment includes a system for instruction address parity comparison in processing circuitry. The system includes an instruction dispatching unit (IDU) to dispatch an instruction, one or more execution units (FXUs) to execute the instruction, and a completion unit (FIN) to complete the instruction. The system also includes a recovery unit (RU) to recover from an error associated with the instruction via an error recovery sequence, and an IFU to fetch the instruction. The IFU performs a method that includes calculating an instruction address parity value for the instruction, and distributing the instruction address parity value to the IDU. The method also includes receiving the distributed instruction address parity value from one or more of: the IDU, the one or more FXUs, and the FIN. The method additionally includes generating an error indicator in response to a mismatch between the received instruction address parity value and a CIA parity value associated with completing the instruction, and outputting the error indicator to the RU.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides instruction address parity comparison. In an exemplary embodiment, a checking scheme is provided that globally covers logic that controls fetching of instructions and advancing of the instructions in processing circuitry containing a pipeline until instruction completion. It employs a continuous flow of instruction address parity through the pipeline with each instruction. By comparing parity of an initial instruction address to parity of a completion instruction address for a common instruction, an error indicator can be generated upon a mismatch. Since the two instruction addresses and their respective parity bits are generated at different stages in the pipeline, the comparison covers various control state machines starting from instruction fetching at the front end of the pipeline all the way through to the back end of the pipeline on instruction completion. Any incorrect handling in the processing circuitry pipeline due to design errors or single event upsets (SEUs) may be caught and completion halted. In processing circuitry that supports a recovery scheme, the errant instruction can be retried. Furthermore, the use of instruction address parity comparison provides extra coverage on instruction decoding logic that implements variable-length instructions in the pipeline, since sequential instruction addresses are dependent on the instruction being decoded.

Figure 1:
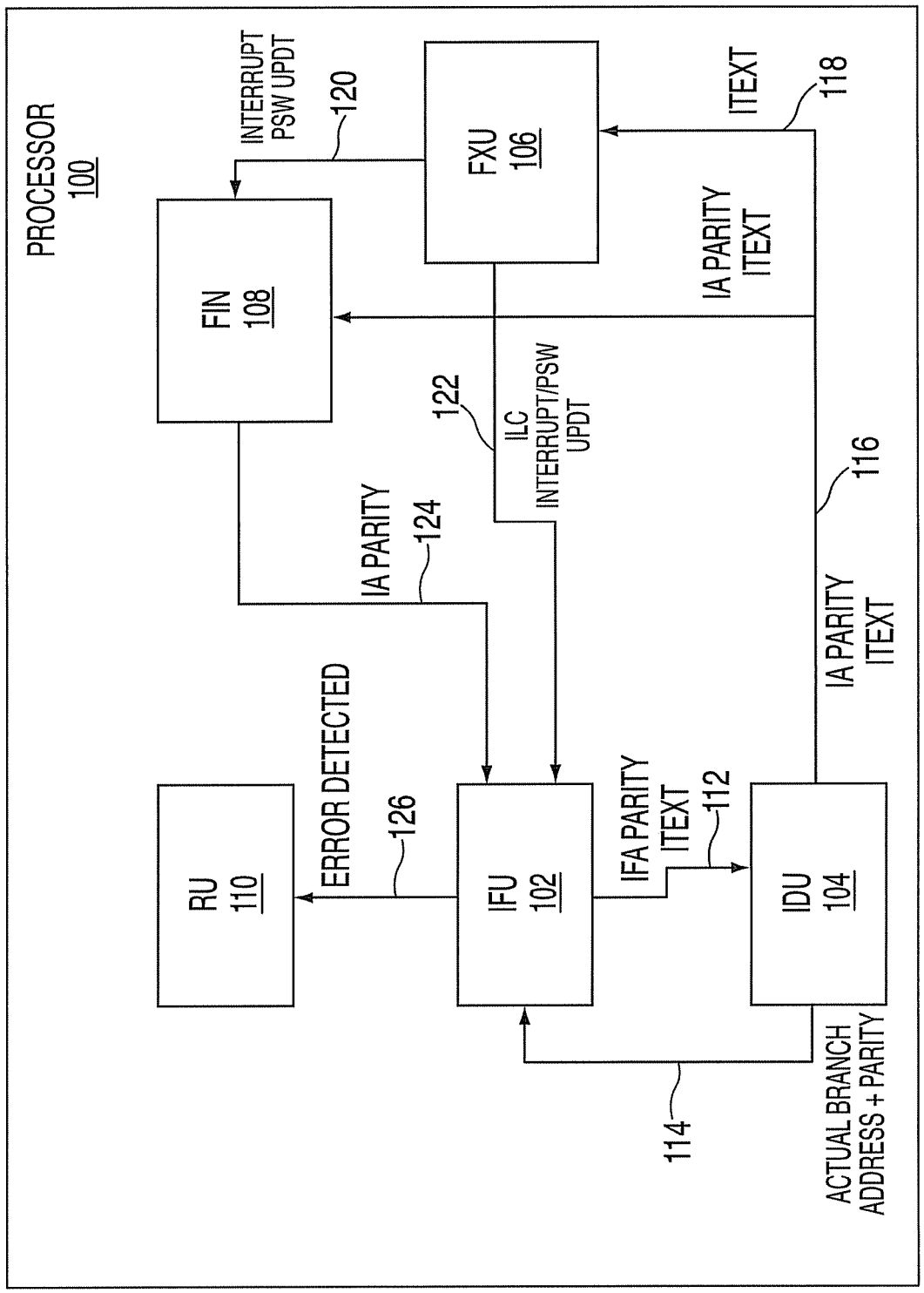
FIG. 1 depicts a block diagram of a processor in accordance with exemplary embodiments.

Turning now to FIG. 1, a processor 100 is depicted that includes multiple functional units to support pipelining of instructions in processing circuitry. Pipelining can increase instruction execution throughput by performing stages such as fetching, decoding, execution and completion in parallel for multiple instructions in a sequence. The processor 100 includes processing circuitry forming a system for instruction address parity comparison. In an exemplary embodiment, functional units in the processor 100 include: instruction fetch unit (IFU) 102, instruction decode unit (IDU) 104, execution unit (FXU) 106, completion unit (FIN) 108, and recovery unit (RU) 110. Multiple communication paths can be used to communicate between each of the functional units 102-110. It will be understood that multiple functional units 102-110 can be implemented within the processor 100 as a superscalar architecture, e.g., multiple FXUs 106. The communication paths may vary in bus width (single-bit to multi-bit) and can be unidirectional or bidirectional. For example, path 112 provides communication from the IFU 102 to the IDU 104, while path 114 provides communication from the IDU 104 to the IFU 102. Communication paths can also be merged or subdivided for routing purposes. For example, path 116 is output from the IDU 116 to the FIN 108 and may be further subdivided as path 118 to communicate with the FXU 106. The FXU 106 can communicate with the FIN 108 via path 120 and with the IFU 102 via path 122. The FIN 108 can communicate with the IFU 102 via path 124. The IFU 102 can send information, such as an error signal to the RU 110 using path 126. It will be understood that the arrangement of functional units 102-110 and paths 112-126 represents an embodiment of the invention and does not limit the scope of the invention.

Figure 2:
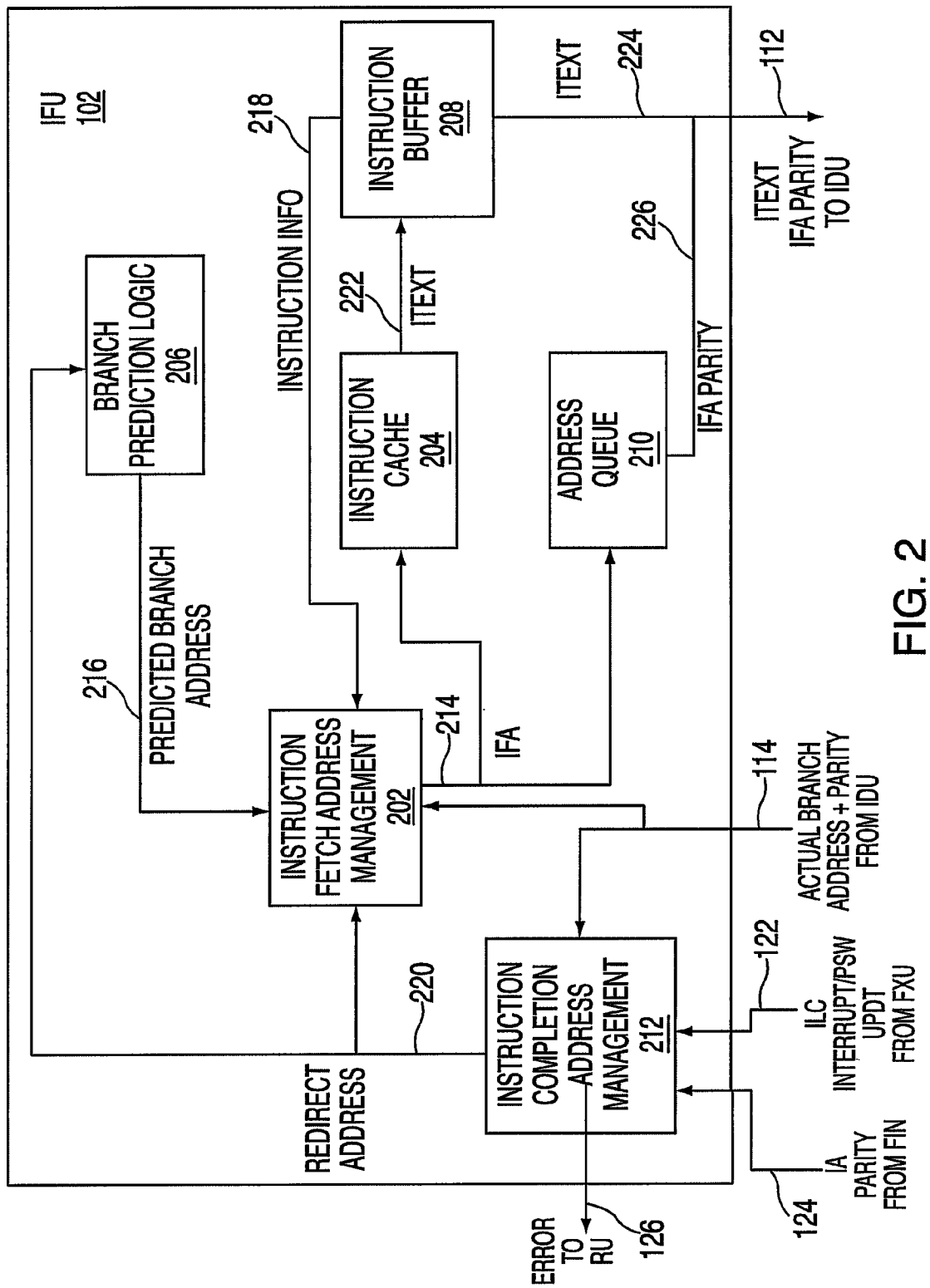
FIG. 2 depicts a block diagram of an instruction fetch unit in accordance with exemplary embodiments.

Turning now to FIG. 2, a block diagram of the IFU 102 is depicted in accordance with an exemplary embodiment as part of an instruction pipeline in the processor 100 of FIG. 1. In an exemplary embodiment, the IFU 102 includes an instruction fetch address (IFA) management block 202, an instruction cache 204, branch prediction logic (BPL) 206, an instruction buffer 208, an address queue 210, and an instruction completion address management block 212. The IFA management block 202 communicates with the instruction cache 204 and the address queue 210 using path 214. The IFA management block 202 also receives inputs from BPL 206 via path 216, instruction buffer 208 via path 218, and instruction completion address management block 212 via path 220. Path 220 also allows the instruction completion address management block 212 to communicate with the BPL 206.

The IFA management block 202 determines an IFA as an instruction address to fetch from the instruction cache 204. Data received from the instruction cache 204 contains the instruction to be decoded and executed. The IFA management block 202 can calculate the IFA using various sources, including but not limited to, branch target prediction, sequential fetching, relative branch calculation and pipeline redirection. Branch target prediction comes from prior encountered branch target addresses predicted from a branch buffer table (BTB) in accordance with a branch history table (BHT) inside BPL 206. Sequential fetching increments the IFA according to an instruction length code (ILC) of the last instruction fetched. ILCs may vary for different instructions if the architecture of the processor 100 of FIG. 1 supports variable-length instructions. Relative branch redirection can be calculated using a relative change to current instruction address based on the last instruction text (ITEXT) fetched together some static or dynamic branch direction prediction scheme. Pipeline redirection can come from incorrectly predicted branches or processor pipeline interrupts, such as a program interrupt. Thus, the IFA determination is based of various states of branch prediction, pipeline decode, execution and branch resolution. Handling of all these inputs that affect the IFA involves a high degree of complexity.

Once the IFA management block 202 determines the IFA, it is sent to the instruction cache 204, which passes corresponding instruction text (ITEXT) via path 222 to the instruction buffer 208. The ITEXT is then output from the instruction buffer 208 via path 224. In an exemplary embodiment, the address queue 210 generates IFA parity, which is output on path 226 and merged with path 224 as path 112 for pipelining the ITEXT and IFA parity to the IDU 104 of FIG. 1. Therefore, when an instruction is sent from the IFU 102 to the IDU 104, the corresponding parity of the IFA used for that instruction is also sent. It should be clear to those skilled in the art that various design choices can be used to synchronize the IFA parity and the ITEXT delivery from IFU 102 to IDU 104.

Continuing with FIG. 1, as the IDU 104 decodes and dispatches the instruction, it maintains the IFA parity with the ITEXT. In this particular design, the IDU 104 also determines the actual branch address during execution, and calculates parity of the address. The IFU 102 receives the branch target address and its parity from IDU 104 through interface 114. Upon detecting a wrong branch prediction, the processor pipeline is flushed, and the IFA management unit 202 is restarted using the branch target address received from IDU 104 as its initial IFA.

When an instruction is dispatched, the corresponding ITEXT is sent from the IDU 104 to the FXU 106, while the IFA parity and ITEXT are also sent to the FIN 108. When the FXU 106 completes execution, it sends the ILC of the instruction to the IFU 102, while the FIN 108 forwards the corresponding IA parity to the IFU 102. Note that at this part of the processor pipeline, or sometimes earlier, the ITEXT represent any information generated using the raw ITEXT itself or any other information generated based on the raw ITEXT and its relationship to the pipeline design. If a pipeline redirect happens for an interrupt or a program status word (PSW) update, the FXU 106 can notify the IFU 102 and the FIN 108. In those cases, either there is a predetermined address to restart instruction fetching, or it will be communicated from FXU 106 to IFU 102.

In an exemplary embodiment, the IFU 102 calculates a completing instruction address (CIA) in the instruction completion address management block 212 of FIG. 2. The next CIA may be based on the current completing instruction address CIA plus the ILC from the FXU 106 received via path 122 during completion, if no pipeline redirection is encountered. If a branch is executed, the next CIA is updated using the branch address from IDU 104, received on path 114. The IA parity 124 forwarded from the FIN 108, representing the parity of the instruction address calculated during instruction fetching time for the current instruction, is compared to the parity of the current CIA. If they differ, an error is identified and the instruction completion address management block 212 notifies the RU 110. The RU 110 maintains a copy of architected and machine states for the processor 100, which may be protected using an error-correcting code (ECC). The RU 110 collects errors detected from functional units in the processor 100 and may initiate an error recovery sequence, including a reset and an instruction retry sequence. The instruction retry sequence involves restoring states from the RU 110 and resuming execution of instructions when an error occurs. In an alternate exemplary embodiment, the CIA generation and error detection are performed in the FIN 108, or any logic that is responsible for instruction completion.

Since the IA parity is transferred between multiple functional units in the processor 100 as an instruction progresses through the pipeline over a period of time, verifying that the IFA parity matches the CIA parity provides a simple error detection mechanism that can reveal a design flaw or SEU in the functional units upon a mismatch. In alternate exemplary embodiments, multiple byte-based instruction address parity values are passed through the pipeline, improving error isolation at the expense of additional signals. Using a single IA parity bit with the information flow may reduce design complexity and expense, as compared to sending multiple bits for checking purposes, e.g., the full instruction address value.

Figure 3:
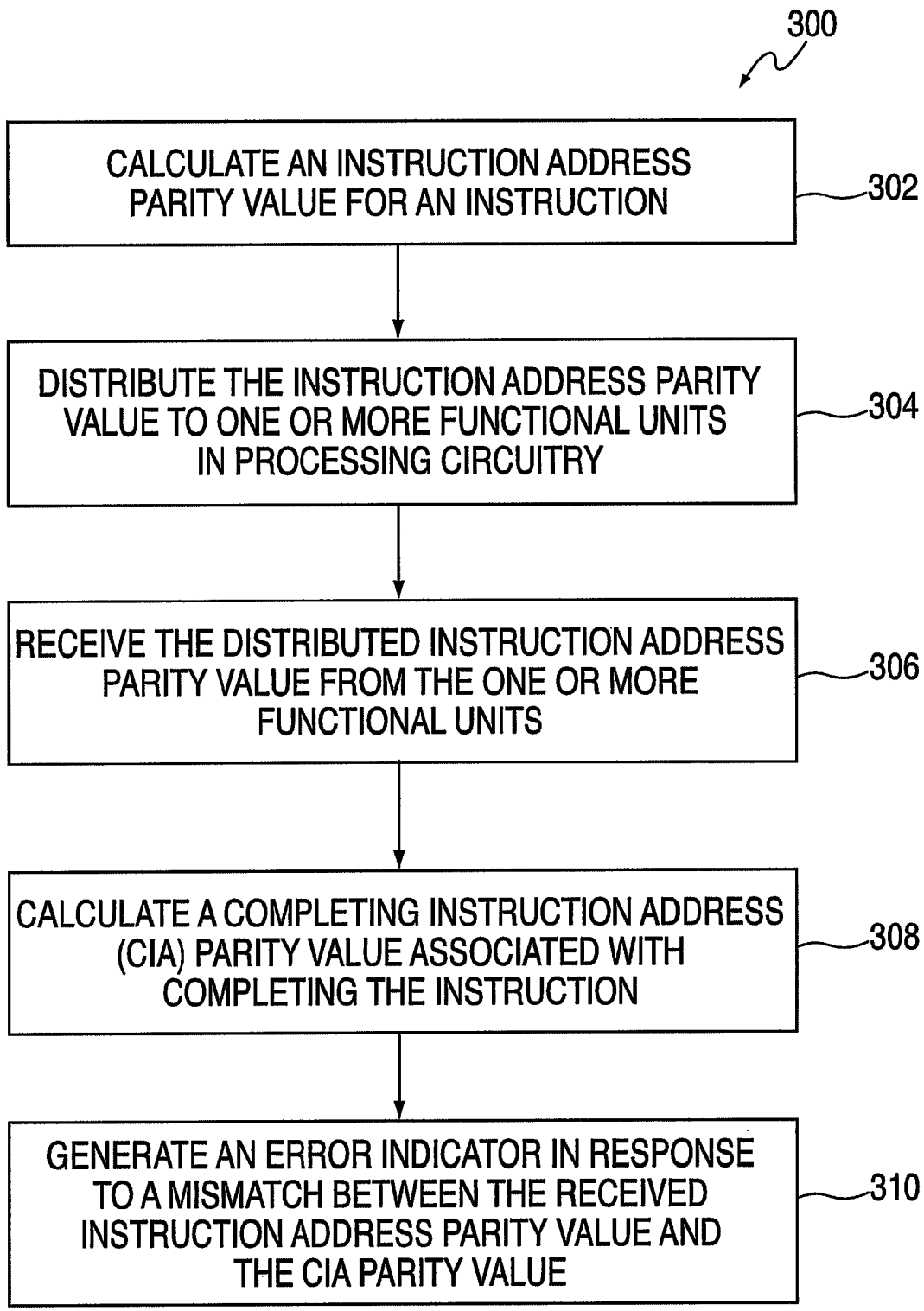
FIG. 3 depicts an exemplary process for instruction address parity comparison in accordance with exemplary embodiments.

Turning now to FIG. 3, a process 300 for instruction address parity comparison will now be described in reference to the processor 100 of FIG. 1 and in accordance with exemplary embodiments. At block 302, the IFU 102 calculates an IA parity value for an instruction. The IA for fetching the instruction may be calculated by the IFA management block 202 of FIG. 2 as an IFA 214, making adjustments for predicted branches, actual branches, redirection, or sequential instruction advancement. Adjustments can be based on internal logic blocks in the IFU 102 or from external logic blocks to the IFU 102, such as an actual branch address value 114 from the IDU 104.

At block 304, the IFU 102 distributes the IA parity value to one or more functional units in the processing circuitry, e.g., the IDU 104, FXU 106, and the FIN 108. The IA parity value may be distributed either directly or indirectly by the IFU 102 to pass the IA parity value through pipeline stages. The IA parity value can be sent along with ITEXT or any other related instruction information of the corresponding instruction, although the IA parity value and the ITEXT (or any other corresponding instruction processing information) may be passed to different functional units in the processor 100.

At block 306, the IFU 102 or the FIN 108 may receive the distributed IA parity value from the one or more functional units depending upon where address mismatch error detection is implemented. For example, the instruction completion address management block 212 of FIG. 2 receives IA parity from the FIN 108 and generates an error indicator to output to the RU 110.

At block 308, the IFU 102 or the FIN 108 can calculate a current CIA parity value associated with completing the instruction. The current CIA parity could also have been generated with the generation on CIA itself. Again, in the example depicted in FIG. 2, the instruction completion address management block 212 calculates the CIA parity value and determines the CIA upon which the CIA parity value is calculated. The CIA can be determined as a function of information provided from the various functional units. For example, the next CIA and CIA parity value after a taken branch may be determined as a function of an actual branch address and parity value from the IDU 104. The CIA and CIA parity value may also be determined as a function of one or more of: an instruction length code, an interrupt, and a program status word update from the FXU 106.

At block 310, the IFU 102 or the FIN 108 generates an error indicator in response to a mismatch between the received IA parity value and the current CIA parity value. In an exemplary embodiment, the instruction completion address management block 212 of FIG. 2 outputs the error indicator to the RU 110, where the RU 110 supports an error recovery sequence. Since the IA parity value flows through multiple functional units as the associated instruction is fetched, dispatched, executed, and completed, a design flaw or SEU event may be detected as a mismatch of the IA parity value and the CIA parity value, which are generated by different logic that should be working coherently, but with differing dependencies and at different points in time.

While the process 300 is described in reference to the processor 100 of FIG. 1, it will be understood that the process 300 can be applied to any processing circuitry that incorporates instruction flows which requires instruction address calculations. For example, process 300 can be applied to other digital designs, such as an application specific integrated circuit (ASIC), a programmable logic device (PLD), or other such digital devices capable of processing instructions. Therefore, the processor 100 of FIG. 1 can represent a variety of digital designs that incorporate processing circuitry.

Technical effects and benefits include enhancing error detection in processing circuitry using instruction address parity comparison. By using an instruction address parity comparison, overall susceptibility of a digital design to unexpected address changes in an instruction pipeline is improved. Should an SEU, such as an alpha particle, causes a change in state that affect the generation of an instruction address value in the pipeline, the event can be detected and an appropriate response performed. Further benefits include mitigating the effects of SEU events by actively monitoring and reacting to errors during normal processing. In a modern processor, much of the instruction flow logic in an IDU/FXU/FIN can be just as complex as the instruction address calculation in an IFU; therefore, providing a simple approach to detect unexpected changes to instruction addresses in the pipeline can reduce integration and debugging time for the design. Further advantages may include identification of design problems if processing circuitry selection logic has a design flaw, and thus does not behave consistently.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for instruction address parity comparison, the method comprising:
    calculating an instruction address parity value for an instruction, the calculating an instruction address parity value responsive to an instruction address for fetching the instruction;
    distributing the instruction address parity value to one or more functional units in processing circuitry;
    receiving the distributed instruction address parity value from the one or more functional units;
    calculating a completing instruction address (CIA) parity value associated with completing the instruction, the calculating a CIA parity value responsive to a completion address for the instruction that is generated subsequent to execution of the instruction; and
    generating an error indicator in response to a mismatch between the received instruction address parity value and the CIA parity value.

2. The method of claim 1 further comprising:
outputting the error indicator to a recovery unit (RU), wherein the RU supports an error recovery sequence.

3. The method of claim 1 wherein the one or more functional units are part of a pipeline in the processing circuitry, the pipeline including an instruction fetching unit (IFU), an instruction dispatching unit (IDU), one or more execution units (FXUs), and a completion unit (FIN).

4. The method of claim 3 wherein the IFU calculates the instruction address parity value upon determining the instruction address for fetching the instruction.

5. The method of claim 4 wherein the IFU adjusts the instruction address for fetching the instruction as a function of an actual branch address provided by the IDU.

6. The method of claim 3 wherein the IFU calculates the CIA parity value associated with completing the instruction.

7. The method of claim 3 wherein the FIN calculates the CIA parity value associated with completing the instruction.

8. The method of claim 3 wherein a CIA is determined for calculating the CIA parity value as a function of an actual branch address and parity value from the IDU.

9. The method of claim 3 wherein a CIA is determined for calculating the CIA parity value as a function of one or more of: an instruction length code, an interrupt, and a program status word update from the one or more FXUs.

10. The method of claim 1 further comprising:
passing instruction text or other instruction processing information corresponding to the instruction with the instruction address parity value to the one or more functional units in the processing circuitry.

11. A system for instruction address parity comparison in processing circuitry, the system comprising:
an instruction fetching unit (IFU) configured to communicate with one or more functional units in the processing circuitry, the IFU configured to perform a method comprising:
calculating an instruction address parity value for the instruction, the calculating an instruction address parity value responsive to an instruction address for fetching the instruction;
distributing the instruction address parity value to the one or more functional units in the processing circuitry;
receiving the distributed instruction address parity value from the one or more functional units;
calculating a completing instruction address (CIA) parity value associated with completing the instruction, the calculating a CIA parity value responsive to a completion address for the instruction that is generated subsequent to execution of the instruction; and
generating an error indicator in response to a mismatch between the received instruction address parity value and the CIA parity value.

12. The system of claim 11 wherein the method further comprises:
outputting the error indicator to a recovery unit (RU), wherein the RU supports an error recovery sequence.

13. The system of claim 11 wherein the one or more functional units are part of a pipeline in the processing circuitry, the pipeline including the IFU, an instruction dispatching unit (IDU), one or more execution units (FXUs), and a completion unit (FIN).

14. The system of claim 13 wherein the IFU calculates the instruction address parity value upon determining the instruction address for fetching the instruction.

15. The system of claim 14 wherein the IFU adjusts the instruction address for fetching the instruction as a function of an actual branch address provided by the IDU.

16. The system of claim 13 wherein a CIA is determined for calculating the CIA parity value as a function of an actual branch address and parity value from the IDU.

17. The system of claim 13 wherein a CIA is determined for calculating the CIA parity value as a function of one or more of: an instruction length code, an interrupt, and a program status word update from the one or more FXUs.

18. The system of claim 11 wherein the IFU further performs:
passing instruction text or other instruction processing information corresponding to the instruction with the instruction address parity value to the one or more functional units in the processing circuitry.

19. A system for instruction address parity comparison in processing circuitry, the system comprising:
an instruction dispatching unit (IDU);
at least one execution unit (FXU);
a completion unit (FIN);
a recovery unit (RU); and
an instruction fetching unit (IFU), the system configured to perform a method comprising:
calculating an instruction address parity value for the instruction, the calculating an instruction address parity value for the instruction responsive to an instruction address for fetching the instruction;
distributing the instruction address parity value to the IDU;
receiving the distributed instruction address parity value from one or more of: the IDU, the one or more FXUs, and the FIN;
calculating a completing instruction address (CIA) parity value associated with completing the instruction, the calculating a CIA parity value responsive to a completion address for the instruction that is generated subsequent to execution of the instruction;
generating an error indicator in response to a mismatch between the received instruction address parity value and the (CIA) parity value associated with completing the instruction; and
outputting the error indicator to the RU.

20. The system of claim 19 wherein the FIN calculates the CIA parity value associated with completing the instruction.

* * * * *